A. FAY.
VULCANIZER.
APPLICATION FILED AUG. 10, 1918.
1,285,088.
Patented Nov. 19, 1918.
3 SHEETS—SHEET 1.
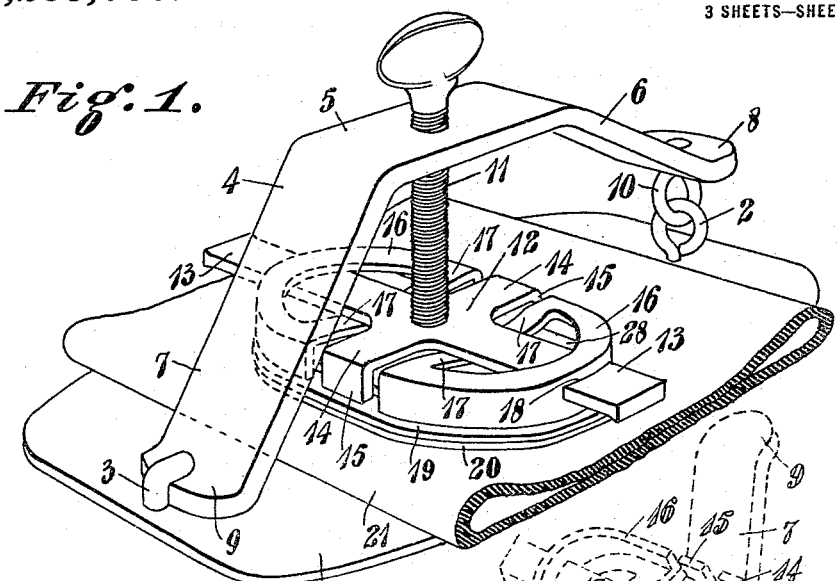
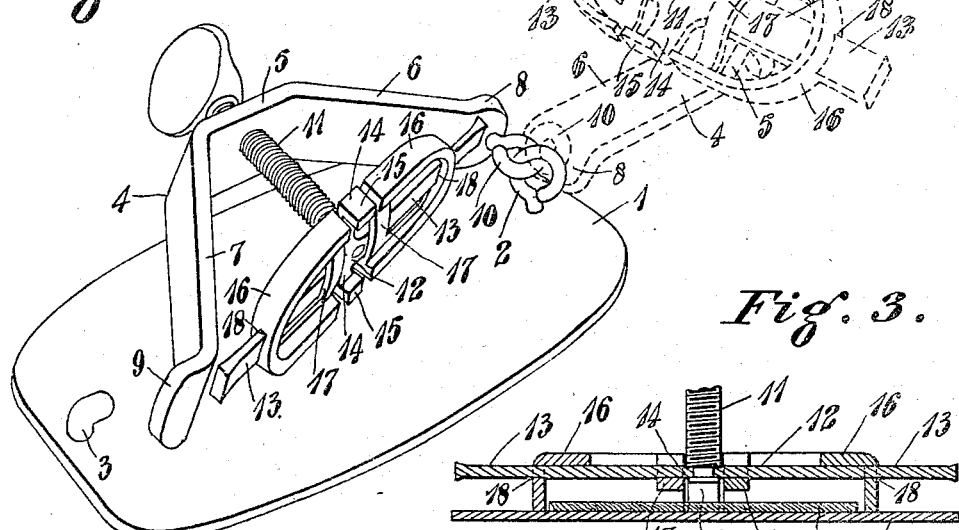
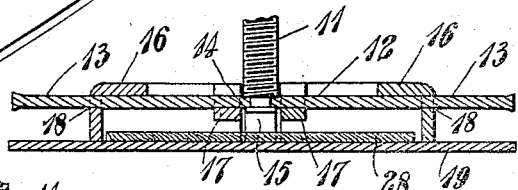
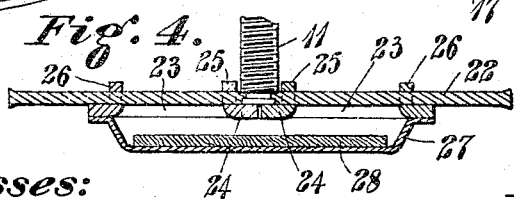
Witnesses:
Clarence Perdew
Helen Maier
Inventor
Alpheus Fay

A. FAY.
VULCANIZER.
APPLICATION FILED AUG. 10, 1918.

1,285,088.

Patented Nov. 19, 1918.

Witnesses:
Clarence Perdew
Helen Maier

Inventor
Alpheus Fay

A. FAY.
VULCANIZER.
APPLICATION FILED AUG. 10, 1918.
1,285,088.
Patented Nov. 19, 1918.
3 SHEETS—SHEET 3.
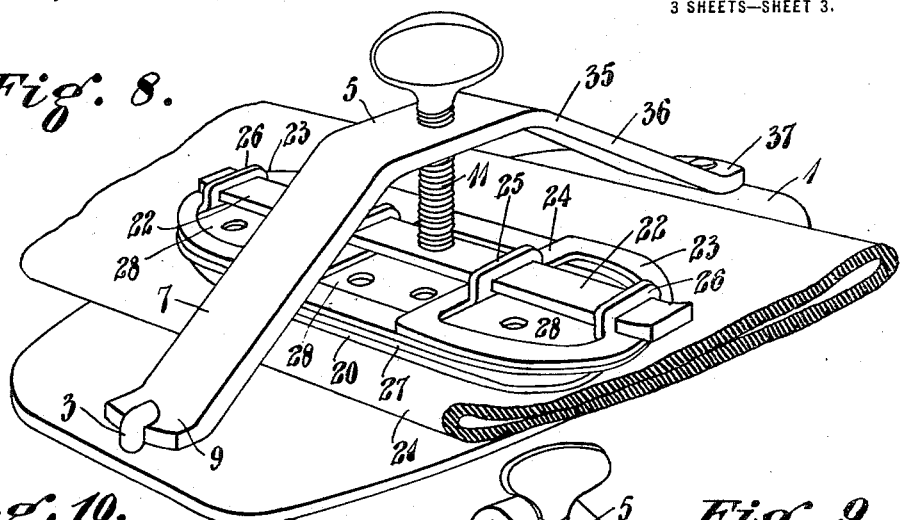
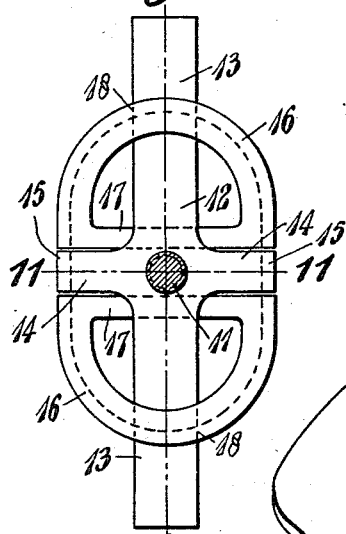
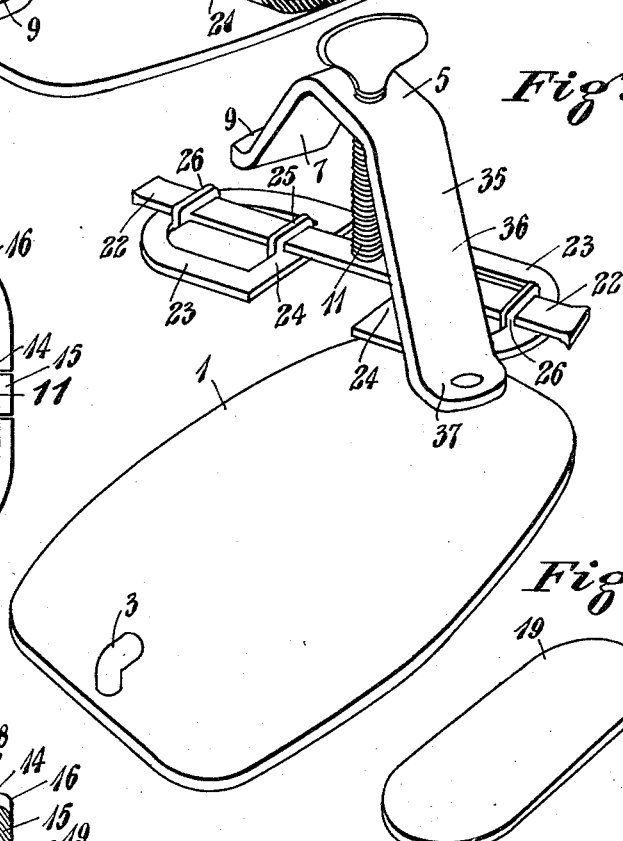
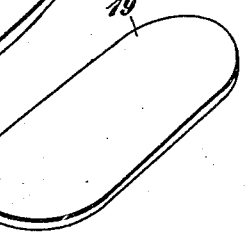
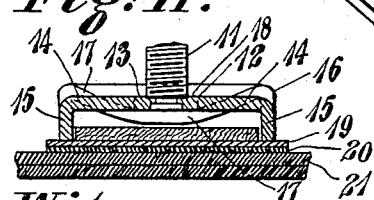
Witnesses:
Clarence Perdew
Helen Maier
Inventor
Alpheus Fay

UNITED STATES PATENT OFFICE.

ALPHEUS FAY, OF LOUISVILLE, KENTUCKY.

VULCANIZER.

1,285,088.  Specification of Letters Patent.  Patented Nov. 19, 1918.

Application filed August 10, 1918.  Serial No. 249,306.

*To all whom it may concern:*

Be it known that I, ALPHEUS FAY, a citizen of the United States, and a resident of Louisville, in the county of Jefferson and State of Kentucky, have invented certain new and useful Improvements in Vulcanizers, of which the following is a specification.

My invention relates to portable vulcanizing apparatus for application of patches to the inner tubes of pneumatic tires, or to similar articles which may be patched in such manner.

The object of my invention is to simplify the construction and add to the convenience of use of apparatus of this character.

In the drawing:

Figure 1 is a general perspective view of a device embodying my invention, and showing part of a tire with a patch being applied thereto;

Fig. 2 is a similar view of said device but showing in full lines how the device is folded for storage or shipment, and showing by dotted lines how the device is opened for inserting the tire to be vulcanized;

Fig. 3 is a partial longitudinal vertical section on a plane corresponding to the line 3—3 of Fig. 10;

Fig. 4 is a similar section on a plane corresponding to the line 4—4 of Fig. 7;

Fig. 8 is a general perspective view similar to Fig. 1 showing another modification;

Fig. 9 is a similar view, but showing the modified device of Fig. 8 open for insertion of the tire to be vulcanized;

Fig. 10 is a detail plan view of the yoke of Figs. 1 to 3 and 5 and 6;

Fig. 11 is a vertical cross-section on a plane corresponding to the line 11—11 of Fig. 10; and Fig. 12 is a detail perspective view of the heat-transmitting element or plate used with the yoke of Figs. 10 and 11.

Figure 5:
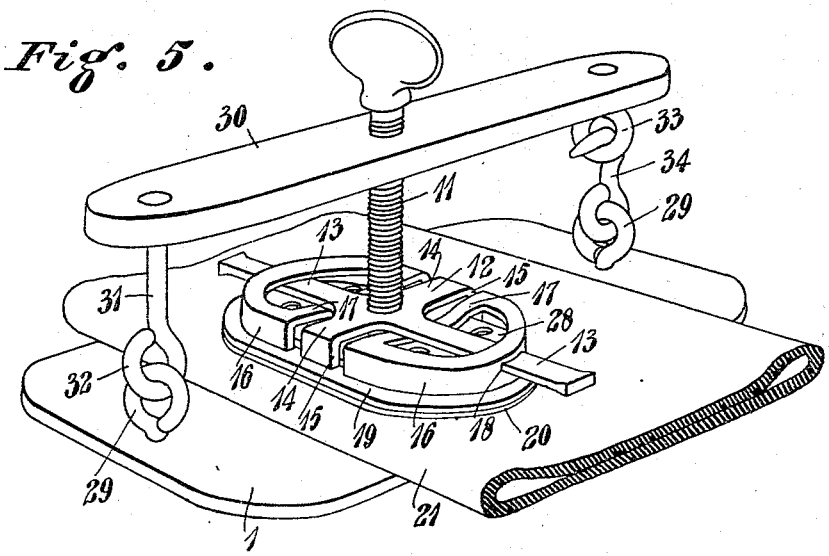
Fig. 5 is a general perspective view similar to Fig. 1.

As shown in Figs. 1 and 2, the relatively wide and flat base-plate 1 has fixed in it and extending upward from it near one end an eye 2, and fixed in it and extending up from it near its other end a stud 3, which is bent over horizontally toward the end which has the eye 2.

The beam 4 comprises a relatively short horizontal middle part 5 and parts 6 and 7 sloping from it downward toward the respective ends of the base-plate 1 and terminating in short substantially horizontal parts 8 and 9, respectively, near the ends of the base-plate 1.

The downwardly inclined part 6 is shorter than the downwardly inclined part 7, and its short horizontal end part 8 has fixed in it and depending from it an eye 10 linked in the eye 2 of the base-plate 1, so that an articulated connection is made at this end between the beam 4 and the base-plate 1, which will permit the beam 4 to be swung into a great variety of positions relative to the base-plate, as instanced in Fig. 2. The other or longer part 7 has its short end part 9 slipped under the bent stud 3 to place the device in operative condition.

The thumb-screw 11 passes down through the horizontal part 5 of the beam 4, and has swiveled on its lower end, the yoke bar 12, which comprises the long straight part 13 with transverse extensions or arms 14 coincident with the connection of the screw 11 to the bar 12 and which have downturned end parts 15. The yoke-pieces 16 are slidable longitudinally of the part 13 at respective sides of the arms 14, and each yoke-piece is substantially in the form of an angle-bar bent around into U-shape, with one flange extending downward and the other extending inwardly of the U, and with the terminal parts integrally joined by a strip 17. The downwardly extending flange at the bottom of the U has a transverse slot 18, and the end of the bar 13 extends through this slot 18, and the strip 17 is bent down at the middle under the bar 13. These yoke-pieces 16 are of approximately the same transverse extent, so that the downturned end parts 15 of the arms 14 are substantially in line with the downwardly extending flange at the terminations of the yoke-pieces 16. The ends of the bar 13 are enlarged slightly so that they will not pass through the slot 18; thus preventing the yoke-pieces 16 from sliding completely off the bar 13.

Such a yoke as this is used in conjunction with a flat plate 19 which is placed directly on the patch 20 which has been properly applied to the rent in the inner tube 21, or other article to be patched. Different sized rents, and different sized plates or the same plate 19, may be used for the different sized patches. The important requirement is to have especially firm clamping around the edges of the patch. In this yoke, the yoke-pieces 16 may be slid out as far as required on the bar 13 to cause them to fit different sized patches, in accordance with the requirements just referred to.

In the modified yoke of Figs. 4, 7, 8 and 9, the yoke bar 22 is simply straight and swiveled to the screw near its center, and each yoke-piece 23 comprises simply a flat U-shaped part with its terminals integrally joined by a flat strip 24 which has a slotted lug 25 bent up from it while a similar lug 26 is bent up from the bottom of the U, and the bar 22 extends through the slots in these lugs 25 and 26 with its end parts enlarged to prevent the pieces 23 from sliding entirely off the bar.

This modified adjustable yoke is used in connection with a pan 27, different sizes of which may be used with different sized patches, and calling for adjustment of the yoke pieces 23 along the bar 22 to properly bear on the rim of the particular sized pan used. The extreme inward adjustment is seen in Fig. 4, and the yoke is seen adjusted for a longer pan in Figs. 7, 8 and 9.

In either case, a suitable combustible 28 is suitably placed inside the yoke over the plate 19 or pan 27, as the case may be, which, when it burns, will transmit heat through the plate 19 or pan 27 to the patch 20.

Figure 6:
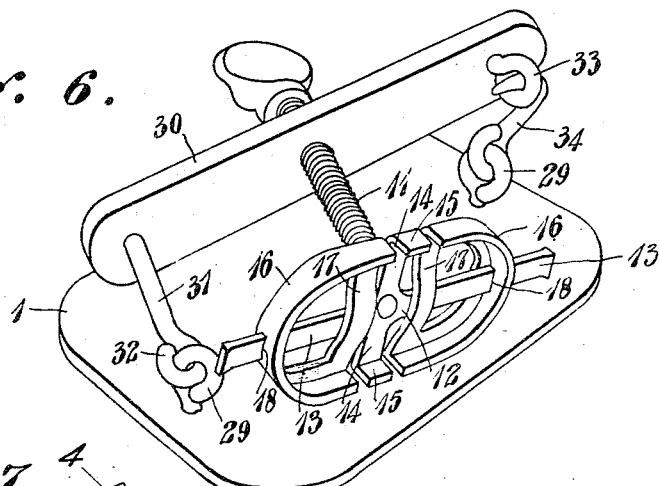
Fig. 6 is a similar view showing how this modification is folded or collapsed for storage or shipment.

In the modified device of Figs. 5 and 6, the base-plate 1 has upwardly extended eyes 29 at both ends, and the beam 30 is simply straight, and has extending down from one end part, a stud 31 with an eye 32 on its lower end linked in the eye 29 in the adjacent end of the base-plate 1. At the other end, the bar 30 has an eye 33 extending downward, and a hook 34 is swiveled in the eye 29 at that end of the base-plate and may engage in the eye 33 of the beam 30.

Figure 7:
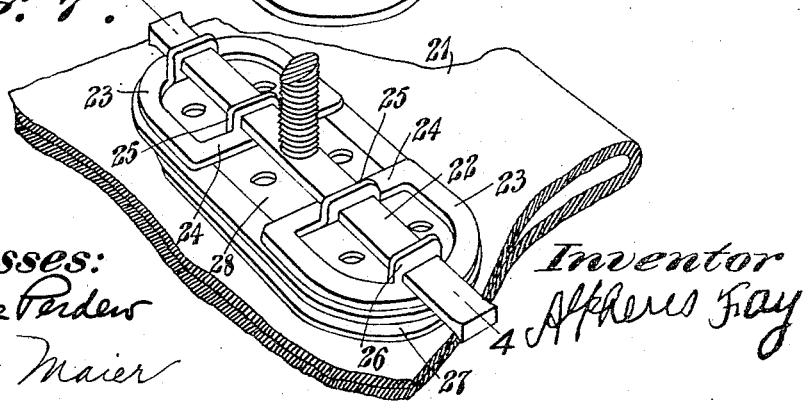
Fig. 7 is a detail perspective view of the yoke shown in section in Fig. 4.

The yoke and associated parts are as shown in Figs. 1, 2 and 3; but it will be understood that this device may have the yoke and other parts, as shown in Figs. 4 and 7.

In these examples of Figs. 1, 2, 5 and 6, the more or less articulated connections between the beam and the base-plate hold the beam firmly enough to permit the screw 11 to exert the required pressure through the yoke and associated parts upon the patch; and at the same time the device is readily opened for placing the article to be patched upon the base-plate, and to afford plenty of room for adjusting the patch and the plate 19 or pan 27, as the case may be. This is clearly indicated by the dotted lines in Fig. 2, and it will be understood that the device of Figs. 5 and 6 may be opened in substantially the same way. Either one of the devices collapses or folds together rather compactly for shipping and storage in the store or in the user's tool kit. When the device of Figs. 5 and 6 is collapsed as shown in Fig. 6, the hook 34 may be again hooked in the eye 33 to hold the device in its collapsed condition.

In the modification of Figs. 8 and 9, the beam 35 is similar to that of Figs. 1 and 2, but its downwardly extended part 36 is relatively longer than the part 6 of the other example, and has its short horizontal end part 37 pivoted to the base-plate 1, so that the beam may swing substantially only in the plane of the base-plate. The other end of the beam engages under the stud 3 of the base-plate, as in Figs. 1 and 2, and its parts are therefore given the same reference numerals. This example has an advantage over the preceding ones in that it is more self-sustaining when opened, as shown in Fig. 9, but is not so convenient because it cannot be collapsed.

In any of these examples, it will be noted that the base-plate 1 is a simple flat plate, and the beam is a plain bar with very simple bends, and the only other parts of the clamp frame are thus riveted onto the beam or the base-plate, as the case may be. This makes this part of the device very inexpensive. The adjustable yoke is also very simple and inexpensive and easily adjusted, and the entire construction in any example is such as to afford a very inexpensive and convenient vulcanizing apparatus for small patches.

While certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a vulcanizer, a flat base plate, a beam arched from end to end of said base plate and movably secured to said base plate at one of said ends and detachably secured to said base plate at the other of said ends, an extensible yoke, and means carried by said beam near the middle thereof to clamp said yoke against suitably heated means on an article to be patched.

2. In a vulcanizer, a flat base plate, a beam arched from end to end of said base plate, means connecting one end of said beam to one end of said base plate and permitting said beam to be swung upward and outward or sidewise and downward relatively to said base plate, means for detachably securing the other end of said beam to the other end of said base plate, an extensible yoke, and means carried by said beam near the middle thereof to clamp said yoke against suitably heated means on an article to be patched.

3. In a vulcanizer, a clamping frame, an extensible yoke, and means carried by said clamping frame to clamp said yoke against suitably heated means on an article to be patched.

4. In a vulcanizer, a clamping frame, a yoke comprising an elongated bar and separate pieces slidable along said bar, and means carried by said clamping frame to clamp said yoke against suitably heated means on an article to be patched.

5. In a vulcanizer, a clamping frame, a yoke comprising an elongated bar with laterally extended arms at its middle, and separate pieces slidable along said bar near respective ends thereof, and means carried by said clamping frame to clamp said yoke against suitably heated means on an article to be patched.

6. In a vulcanizer, a clamping frame, a yoke comprising an elongated bar with laterally extended arms near its middle, said arms having downwardly turned end parts, and separate pieces slidable along said bar near respective ends thereof, each having a depending rim alined with said downwardly turned end parts at opposite sides of the yoke, and means carried by said clamping frame to clamp said yoke against suitably heated means on an article to be patched.

7. In a vulcanizer, a clamping frame, a yoke comprising an elongated bar with laterally extended arms at its middle, and separate pieces slidable along said bar near respective ends thereof, each having a depending rim with a slot receiving said bar and a lug extending along over said bar and a strip extending across under said bar, and means carried by said clamping frame to clamp said yoke against suitably heated means on an article to be patched.

8. In a vulcanizer, a clamping frame, a yoke comprising an elongated bar with laterally extended arms near its middle, said arms having downwardly turned end parts, and separate pieces slidable along said bar near respective ends thereof, each having a depending rim alined with said downwardly turned end parts at opposite sides of said yoke, said depending rims having slots receiving said bar, and each of said pieces also having a leg extending along over said bar and a strip extending across under said bar, and means carried by said clamping frame to clamp said yoke against suitably heated means on an article to be patched.

9. In a vulcanizer, a flat base plate, a beam composed of a flat bar bent into a substantially horizontal middle part and parts inclining down in opposite directions from said middle part with substantially horizontal end parts near respective ends of said base plate, eyes linked together and fixed, respectively, in one of said end parts of said beam and an end part of said base plate, a stud fixed in said base plate and bent horizontally thereover near the other end of said base plate and receiving thereunder the other end part of said beam, and clamping means carried by said beam near the middle thereof to clamp suitably heated means to an article to be patched.

10. In a vulcanizer, a flat base plate, a beam composed of a flat bar bent into a substantially horizontal middle part and parts inclining down in opposite directions from said middle part with substantially horizontal end parts near respective ends of said base plate, one of said end parts of said beam being pivoted to one end part of said base plate, whereby said beam may swing in substantially the plane of said base plate, a stud fixed in said base plate and bent horizontally thereover near the other end of said base plate and receiving thereunder the other end part of said beam, and clamping means carried by said beam near the middle thereof to clamp suitably heated means to an article to be patched.

ALPHEUS FAY.

Witnesses:
CLARENCE PERDEW,
IRENE PARKER.

Copies of this patent may be obtained for five cents each, by addressing the "Commissioner of Patents, Washington, D. C."